(12) United States Patent
Kimura et al.

(10) Patent No.: US 7,534,850 B2
(45) Date of Patent: May 19, 2009

(54) SILYL GROUP-CONTAINING POLYMER AND ITS PRODUCTION PROCESS

(75) Inventors: Yuuji Kimura, Kamisu (JP); Hideaki Tanaka, Kamisu (JP); Genichirou Enna, Kamisu (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/098,649

(22) Filed: Apr. 7, 2008

(65) Prior Publication Data
US 2008/0194774 A1    Aug. 14, 2008

Related U.S. Application Data

(63) Continuation of application No. PCT/JP2006/319804, filed on Oct. 3, 2006.

(30) Foreign Application Priority Data

Oct. 5, 2005   (JP) .............................. 2005-292854

(51) Int. Cl.
*C08G 63/02* (2006.01)
*C08L 31/00* (2006.01)
(52) U.S. Cl. ................. 528/195; 524/556; 528/25; 528/29; 528/43; 556/437; 556/443
(58) Field of Classification Search ............... 524/556; 528/25, 29, 43; 556/437, 443
See application file for complete search history.

(56) References Cited

U.S. PATENT DOCUMENTS

| 5,032,671 | A  | 7/1991 | Harper |
| 6,207,766 | B1 | 3/2001 | Doi et al. |
| 6,756,465 | B1 | 6/2004 | Jacobine et al. |
| 6,780,934 | B2 | 8/2004 | Doi et al. |

FOREIGN PATENT DOCUMENTS

| EP | 300146      | 1/1989  |
| EP | 397036      | 11/1990 |
| EP | 532049      | 3/1993  |
| JP | 61-218631   | 9/1986  |
| JP | 62-146959   | 6/1987  |
| JP | 1-170681    | 7/1989  |
| JP | 5-9260      | 1/1993  |
| JP | 6-340798    | 12/1994 |
| JP | 8-269315    | 10/1996 |
| JP | 10-245482   | 9/1998  |
| JP | 2000-109676 | 4/2000  |
| JP | 2000-143681 | 5/2000  |
| JP | 2004-292517 | 10/2004 |
| JP | 2005-226043 | 8/2005  |
| WO | 00/00530    | 1/2000  |

OTHER PUBLICATIONS

U.S. Appl. No. 12/098,649, filed Apr. 7, 2008, Kimura et al.
U.S. Appl. No. 09/694,501, filed Oct. 24, 2000, Doi et al.

*Primary Examiner*—Terressa M Boykin
(74) *Attorney, Agent, or Firm*—Oblon, Spivak, McClelland, Maier & Neustadt, P.C.

(57) ABSTRACT

A silyl group-containing polymer which can be cured quickly and strongly, and from which a cured product excellent in antifouling properties and weather resistance while maintaining favorable rubber elasticity can be obtained, and having the following formula (1):

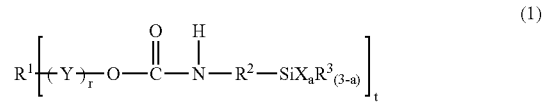

wherein $R^1$: a group having a hydroxyl group(s) removed from a monohydroxy or polyhydroxy compound having t hydroxyl group(s) in its molecule, $R^2$: a bivalent organic group, $R^3$: a $C_{1-20}$ monovalent organic group which may have a substituent, X: a hydroxyl group or a hydrolysable group, Y: a bivalent group of the following formula (A) or (B), "a": an integer of from 1 to 3, r: an integer of from 1 to 1,000, and t: an integer of from 1 to 8, provided that when the silyl group-containing polymer of formula (1) has a plurality of Y's in its molecule, the plurality of Y's may be the same or different, and when t is from 2 to 8, a plurality of monovalent groups bonded to $R^1$ may be the same or different:

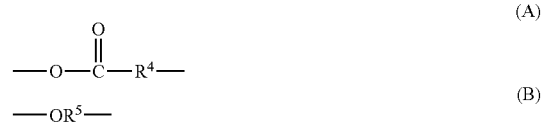

in the formula (A), $R^4$: a $C_{2-8}$ alkylene group, and in the formula (B), $R^5$: a $C_{2-4}$ alkylene Group; and its production process.

22 Claims, No Drawings

SILYL GROUP-CONTAINING POLYMER AND ITS PRODUCTION PROCESS

TECHNICAL FIELD

The present invention relates to a novel silyl group-containing polymer and its production process.

BACKGROUND ART

A cured product containing a silyl group-containing polymer having hydrolysable silyl groups has rubber elasticity and is thereby useful for a sealing material, an adhesive, a coating material etc. for buildings. Regarding such a silyl group-containing polymer, various reports have been made regarding its production process and composition (Patent Documents 1 to 4).

However, the surface of a cured product containing the above silyl group-containing polymer tends to be stained if the degree of cure is insufficient, and when the cured product is used outdoors for a long time, cracking tends to occur on the surface by the action of ultraviolet rays, ozone or the like and the surface is whitened (discolored) in some cases, and the weather resistance is insufficient in some cases.

Under these circumstances, extensive studies and researches have been conducted on a novel silyl group-containing polymer and a composition containing a silyl group-containing polymer so as to improve characteristics of a silyl group-containing polymer such as antiproof properties and weather resistance in recent years.

For example, a method has been proposed wherein an anti-aging agent such as an antioxidant, an ultraviolet absorber or a photostabilizer is blended so as to improve weather resistance of a cured product containing a silyl group-containing polymer, and in addition, a method of blending a polyvinyl cinnamate, an unsaturated acrylic compound, an azide resin or the like, have been proposed (Patent Documents 5 and 6).

Further, a silicone resin composition employing a polyoxyalkylene polymer having trialkoxysilyl groups for the purpose of improving the degree of cure of a cured product containing a silyl group-containing polymer (Patent Document 7) and a block copolymer having an ester bond in its main chain and having a hydrolysable silicon group at its terminal, for the purpose of improving storage stability and adhesion (Patent Document 8) have been disclosed.

Further, as a polymer containing ester groups, a process for producing a polymer having a lactone monomer polymerized has been disclosed (Patent Document 9).

Patent Document 1: JP-A-3-72527 (EP397036A)
Patent Document 2: JP-A-62-146959
Patent Document 3: JP-A-1-131271 (EP300146A)
Patent Document 4: JP-A-1-170681
Patent Document 5: JP-A-5-70531 (EP532049A)
Patent Document 6: JP-A-8-269315
Patent Document 7: JP-A-10-245482
Patent Document 8: U.S. Pat. No. 6,756,465
Patent Document 9: U.S. Pat. No. 5,032,671

DISCLOSURE OF THE INVENTION

Object to be Accomplished by the Invention

However, a cured product obtained by the method disclosed in the above Patent Document 5 or 6 does not necessarily has sufficiently improved whether resistance, and even if it has improved weather resistance, it has drawbacks such as a decrease in the degree of cure by blending of the anti-aging agent, the resin or the like, and not both weather resistance and the degree of cure are simultaneously satisfied.

It is disclosed that the silicone resin composition in Patent Document 7 suppresses the decrease in the degree of cure and has improved storage stability, but has insufficient weather resistance. The silyl group-containing polymer disclosed in Patent Document 8 has strong adhesion but does not have improved weather resistance. Further, Patent Documents 7 and 8 failed to sufficiently disclose the structure of the silicone resin or the block copolymer having a hydrolysable silicon group to be used and characteristics thereby.

Further, the compound in Patent Document 9 is not silylated and has insufficient rubber elasticity as compared with a usual silyl group-containing polymer. Further, the performance when the compound is silylated has not sufficiently been described.

The present invention has been conducted to overcome the above problems of prior art, and its object is to provide a silyl group-containing polymer which can be cured quickly and strongly, and from which a cured product excellent in antifouling properties and weather resistance while maintaining favorable rubber elasticity can be obtained, and a process for producing such a silyl group-containing polymer.

Means to Accomplish the Object

To accomplish the above object, the present invention provides a silyl group-containing polymer represented by the following formula (1):

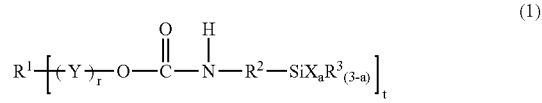

(1)

wherein $R^1$ is a group having a hydroxyl group(s) removed from a monohydroxy or polyhydroxy compound having t hydroxyl group(s) in its molecule, $R^2$ is a bivalent organic group, $R^3$ is a $C_{1-20}$ monovalent organic group which may have a substituent, X is a hydroxyl group or a hydrolysable group, Y is a bivalent group represented by the following formula (A) or a bivalent group represented by the following formula (B), "a" is an integer of from 1 to 3, r is an integer of from 1 to 1,000, and t is an integer of from 1 to 8, provided that when a plurality of Y's are present in the molecule, the plurality of Y's may be the same or different, and when t is from 2 to 8, a plurality of monovalent groups bonded to $R^1$ may be the same or different:

(A)

(B)

in the formula (A), $R^4$ is a $C_{2-8}$ alkylene group, and in the formula (B), $R^5$ is a $C_{2-4}$ alkylene group.

The silyl group-containing polymer of the present invention represented by the above formula (1) is excellent in curing properties, whereby the silyl group-containing polymer can be cured quickly and strongly. Accordingly, a cured product containing the silyl group-containing polymer of the present invention has little surface tack and has little stickiness on the surface. Thus, the above cured product is particularly excellent in antifouling properties against dust.

Further, the cured product containing the silyl group-containing polymer of the present invention is excellent in weather resistance while maintaining favorable rubber elasticity. Accordingly, even if the above cured product is used as exposed to the outdoor for a long period of time, cracking on the surface of the cured product and whitening (discoloration) of the surface of the cured product by the action of ultraviolet rays, ozone or the like are suppressed.

Further, the above silyl group-containing polymer can be combined with various additives. Therefore, by curing the silyl group-containing polymer with additives in combination, not only antifouling properties and weather resistance but also properties (e.g. adhesion) based on the additives can be imparted.

Thus, according to the silyl group-containing polymer of the present invention, quick and strong curing is possible, and a cured product having very low staining properties and excellent in weather resistance while maintaining favorable rubber elasticity can be obtained.

The present invention further provides a silyl group-containing polymer represented by the following formula (2):

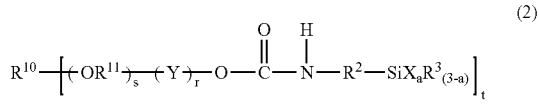

(2)

wherein $R^2$ is a bivalent organic group, $R^3$ is a $C_{1-20}$ monovalent organic group which may have a substituent, $R^{10}$ is a $C_{1-20}$ t-valent hydrocarbon group, $R^{11}$ is a $C_{2-4}$ alkylene group, X is a hydroxyl group or a hydrolysable group, Y is a bivalent group represented by the following formula (A) or a bivalent group represented by the following formula (B), "a" is an integer of from 1 to 3, r is an integer of from 1 to 1,000, t is an integer of from 1 to 8, and s is an integer of from 1 to 250, provided that when a plurality of Y's are present in the molecule, the plurality of Y's may be the same or different, and when t is 2 to 8, a plurality of monovalent groups bonded to $R^{10}$ may be the same or different:

(A)

(B)

in the formula (A), $R^4$ is a $C_{2-8}$ alkylene group, and in the formula (B), $R^5$ is a $C_{2-4}$ alkylene group.

The silyl group-containing polymer of the present invention represented by the above formula (2) is excellent in curing properties, whereby the silyl group-containing polymer can be cured quickly and strongly. Accordingly, a cured product containing the silyl group-containing polymer of the present invention has little surface tack and has little stickiness on the surface. Thus, the above cured product is particularly excellent in antifouling properties against dust.

Further, the cured product containing the silyl group-containing polymer of the present invention is excellent in weather resistance while maintaining favorable rubber elasticity. Accordingly, even if the above cured product is used as exposed to the outdoor for a long period of time, cracking on the surface of the cured product and whitening (discoloration) of the surface of the cured product by the action of ultraviolet rays, ozone or the like are suppressed.

Further, the above silyl group-containing polymer has low viscosity among the silyl group-containing polymers represented by the formula (1) and is thereby excellent in handling efficiency.

Still further, the above silyl group-containing polymer can be combined with various additives. Therefore, by curing the silyl group-containing polymer with additives in combination, not only antifouling properties and weather resistance but also properties (e.g. adhesion) based on the additives can be imparted.

Thus, according to the silyl group-containing polymer of the present invention, quick and strong curing is possible, and a cured product having very low staining properties and excellent in weather resistance while maintaining favorable rubber elasticity can be obtained.

In the silyl group-containing polymer represented by the formula (1) or (2), $R^2$ is preferably a $C_{1-17}$ bivalent hydrocarbon group. In such a case, the material of the silyl group-containing polymer represented by the above formula (1) or (2) can be available at a low cost, whereby the cost for production of the silyl group-containing polymer can be reduced.

In the above formula (1), the Si atom is preferably bonded to the α-position of $R^2$. In such a case, the curing rate of the silyl group-containing polymer can be further increased.

Further, The above silyl group-containing polymer is produced by a production process comprising a first step of reacting a monohydroxy or polyhydroxy compound having from 1 to 8 hydroxyl group(s) in its molecule, a $C_{3-9}$ cyclic ester and a $C_{2-4}$ alkylene oxide in the presence of a polymerization catalyst to obtain a polyester ether polyol, and a second step of reacting the polyester ether polyol and a silyl isocyanate compound in the presence of a urethane-forming catalyst to obtain the silyl group-containing polymer.

According to the production process of the present invention, a silyl group-containing polymer which can be cured quickly and strongly, and from which a cured product having very low staining properties and excellent in weather resistance while maintaining favorable rubber elasticity can be obtained, can be produced. Further, according to the above production process, the obtained silyl group-containing polymer may be a random, random/block or block copolymer depending upon the desired physical properties and purpose of use.

In the above production process, it is preferred that the polymerization catalyst is a double metal cyanide complex catalyst and that the polymerization catalyst and the urethane-forming catalyst are the same.

According to the above production process, in the first step, by use of a neutral double metal cyanide complex catalyst as the polymerization catalyst, hydrolysis of the cyclic ester can be suppressed, whereby a polyester ether polyol can be obtained with a high yield. Further, by the polymerization catalyst and the urethane-forming catalyst being the same, the first step and the second step can be carried out with the same catalyst. Further, by adjusting the amount and the activity of the double metal cyanide complex catalyst to be contained in the first step so that the activity of the double metal cyanide complex catalyst remains even after completion of the first step, the second step can be carried out as it is. Namely, it is possible to allow the reaction to proceed without newly adding a urethane-forming catalyst.

Accordingly, in the second step, a Sn catalyst which is a commonly used urethane-forming catalyst is unnecessary, whereby the amount of the Sn catalyst remaining in the silyl group-containing polymer can be reduced, and accordingly the polymer is excellent in storage stability. Further, in such a case, the first step and the second step can be carried out continuously, whereby the workability will improve, and the yield of the obtained silyl group-containing polymer will improve.

It is preferred that the above double metal cyanide complex catalyst has an organic ligand, and that the organic ligand is at least one member selected from the group consisting of ethylene glycol dimethyl ether, diethylene glycol dimethyl ether and triethylene glycol dimethyl ether from the viewpoint of handling efficiency. Further, with a view to obtaining high catalytic activity, the organic ligand is preferably tert-butyl alcohol or a mixture of tert-butyl alcohol with at least one member selected from the group consisting of n-butyl alcohol, sec-butyl alcohol, iso-butyl alcohol, tert-pentyl alcohol, iso-pentyl alcohol, N,N-dimethylacetamide and ethylene glycol mono-tert butyl ether.

Further, the content of a bivalent group represented by the following formula (A) derived from the cyclic ester in the polyester ether polyol is preferably from 5 to 50 mass %. In such a case, a cured product containing the silyl group-containing polymer is more excellent in whether resistance:

(A)

wherein $R^4$ is a $C_{2-8}$ alkylene group.

Further, it is preferred that the polyester ether polyol has a number average molecular weight (Mn) of from 2,000 to 30,000 and a molecular weight distribution (Mw/Mn) of at most 2.0. In such a case, a cured product containing the silyl group-containing polymer is more excellent in antifouling properties and weather resistance. The molecular weight distribution is a value obtained by dividing the weight average molecular weight (Mw) by the number average molecular weight (Mn). Further, in the present invention, the number average molecular weight (Mn), the weight average molecular weight (Mw) and the molecular weight distribution (Mw/Mn) are molecular weights as calculated as polystyrene obtained by measurement by gel permeation chromatography using an analytical curve prepared by using a standard polystyrene sample of which the molecular weight is known, and the hydroxy value in the present invention is a measured value based on JIS K1557 6.4.

EFFECTS OF THE INVENTION

According to the present invention, a silyl group-containing polymer which can be cured quickly and strongly, and from which a cured product excellent in antifouling properties and weather resistance while maintaining favorable rubber elasticity can be obtained, and its production process, can be provided.

BEST MODE FOR CARRYING OUT THE INVENTION

Now, a first embodiment of the silyl group-containing polymer of the present invention will be described.

The present invention provides a novel silyl group-containing polymer represented by the following formula (1):

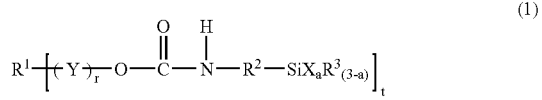

(1)

The structure of the above formula (1) will be described in further detail below.

In the formula (1), $R^1$ is a group having a hydroxyl group(s) removed from a monohydroxy or polyhydroxy compound having t hydroxyl group(s) in its molecule, and t is an integer of from 1 to 8.

Namely, in the formula (1), $R^1$ is a group having a hydroxyl group(s) removed from a monohydroxy or polyhydroxy compound having from 1 to 8 hydroxyl group(s) in its molecule. The monohydroxy or polyhydroxy compound having from 1 to 8 hydroxyl group(s) in its molecule will sometimes be referred to as an "initiator". Namely, the initiator has a structure of $R^1$ having a hydroxyl group(s) added.

For example, in a case where a cyclic ester compound and an alkylene oxide are copolymerized in the presence of the initiator, if the number of hydroxyl groups contained in the initiator exceeds 8, the viscosity of a polyester ether polyol to be obtained tends to be high, thus leading to poor workability as compared with a case where the initiator contains from 1 to 8 hydroxyl groups, if the molecular weight per hydroxyl group is the same. Further, since the molecular weight distribution of the polyester ether polyol to be obtained tends to be broad, a cured product containing a silyl group-containing polymer to be obtained from the polyester polyol tends to have decreased mechanical properties (e.g. elongation). The number of hydroxyl groups contained in the initiator is preferably from 1 to 3, more preferably from 2 to 3. Namely, t is preferably an integer of from 1 to 3, more preferably an integer of from 2 to 3.

In the formula (1), $R^2$ is a bivalent organic group. Particularly, $R^2$ is preferably a $C_{1-17}$ bivalent hydrocarbon group, more preferably a trimethylene group ($—CH_2CH_2CH_2—$). In such a case, the curing properties and the storage stability are well balanced. In a case where the silyl group-containing polymer represented by the formula (1) has a plurality of $R^2$'s, the respective $R^2$'s may be the same or different. Namely, when t is an integer of from 2 to 8, the respective $R^2$'s are independently a bivalent organic group.

Further, the above $R^2$ is preferably bonded to the Si atom at the α-position of $R^2$, and $R^2$ is more preferably a methylene group ($—CH_2—$). In such a case, the curing rate of the silyl group-containing polymer will be further increased.

In the formula (1), $R^3$ is a $C_{1-20}$ monovalent organic group which may have a substituent, preferably a $C_{1-6}$ monovalent organic group. In a case where the silyl group-containing polymer represented by the formula (1) has a plurality of $R^3$'s in its molecule, the respective $R^3$'s may be the same or different. Namely, in a case where "a" is 1, the respective $R^3$'s are independently a $C_{1-20}$ monovalent organic group which may have a substituent.

In the formula (1), X is a hydroxyl group or a hydrolysable group. The hydrolysable group may, for example, be a $—OR$ group. The $—OR$ group is preferably an alkoxy group or an alkenyl group having at most 4 carbon atoms. Specifically, a methoxy group, an ethoxy group, a propoxy group or a propenyl group may, for example, be mentioned. Among them, the $—OR$ group is more preferably a methoxy group or an ethoxy group. In such a case, the curing rate of the silyl group-containing polymer can be further increased. In a case where the silyl group-containing polymer represented by the formula (1) has a plurality of X's in its molecule, the respective X's may be the same or different. Namely, in a case where "a" is an integer of 2 or 3 and/or in a case where t is an integer of from 2 to 8, the respective X's are independently a hydroxyl group or a hydrolysable group.

In the formula (1), "a" is an integer of from 1 to 3. In a case where t is an integer of from 2 to 8, the respective a's are indecently an integer of from 1 to 3.

In the formula (1), Y is a bivalent group represented by the following formula (A) or a bivalent group represented by the following formula (B). In a case where the silyl group-containing polymer represented by the formula (1) has a plurality of Y's in its molecule, the respective Y's may be the same or different. Namely, in a case where r is an integer of from 2 to 1,000 and/or in a case where t is an integer of from 2 to 8, the respective Y's are independently a bivalent group represented by the following formula (A) or a bivalent group represented by the following formula (B).

Accordingly, in the above formula (1), as the arrangement of the bivalent group represented by the following formula (A) or the bivalent group represented by the following formula (B), either one type of groups may be continuously arranged, both types of groups may be randomly arranged, or both such arrangements may be present:

In the above formula (A), $R^4$ is a $C_{2-8}$ alkylene group. Particularly, $R^4$ is preferably a $C_{2-5}$ alkylene group so that the melting point will not be too high, more preferably a linear saturated hydrocarbon chain. In a case where the silyl group-containing polymer represented by the formula (1) has a plurality of the bivalent groups represented by the formula (A), the respective $R^4$'s may be the same or different. $R^4$ is most preferably a n-pentyl group. Namely, the group represented by the above formula (A) is most preferably a group having ε-caprolactone ring-opened.

In the above formula (B), $R^5$ is a $C_{2-4}$ alkylene group. Particularly, from the viewpoint of the viscosity of the silyl group-containing polymer to be obtained, $R^5$ is preferably an ethylene group and/or a propylene group, more preferably only a propylene group. In a case where the silyl group-containing polymer represented by the formula (1) has a plurality of the bivalent groups represented by the formula (B), the respective $R^5$'s may be the same or different.

Further, in the formula (1), r is an integer of from 1 to 1,000. r is preferably an integer of from 10 to 500, more preferably an integer of from 20 to 200. In a case where t is from 2 to 8, the respective r's are independently an integer of from 1 to 1,000.

As described above, the silyl group-containing polymer of the present invention represented by the above formula (1) may contain a random, random/block or block copolymer chain.

According to the novel silyl group-containing polymer represented by the above formula (1), quick and strong curing is possible, and antifouling properties and weather resistance of a cured product containing such a silyl group-containing polymer can be improved.

Now, a second embodiment of the silyl group-containing polymer of the present invention will be described. The same or equal constituents as in the first embodiment are expressed by the same symbols, and the duplicate expression will be omitted.

The present invention provides a novel silyl group-containing polymer represented by the following formula (2):

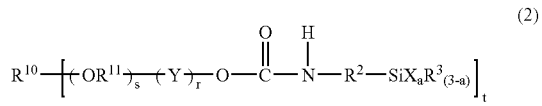

In the above formula (2), $R^2$, $R^3$, X, Y, a, r and t are the same as $R^2$, $R^3$, X, Y, a, r and t in the above formula (1). Namely, the silyl group-containing polymer represented by the above formula (2) is the same as the silyl group-containing polymer represented by the above formula (1) except that it has $R^{10}$ and a $—(OR^{11})_s—$ group(s) in a number corresponding to the valency of $R^{10}$ between $R^{10}$ and Y, instead of $R^1$.

In the formula (2), $R^{10}$ is a $C_{1-20}$ t-valent hydrocarbon group. Particularly, $R^{10}$ is preferably a $C_{1-10}$ t-valent hydrocarbon group.

In the formula (2), $R^{11}$ is a $C_{2-4}$ alkylene group, preferably a $C_{2-3}$ alkylene group. In a case where the silyl group-containing polymer represented by the formula (2) has a plurality of $R^{11}$'s in its molecule, the respective $R^{11}$'s may be the same or different. Namely, in a case where s is an integer of from 2 to 250 and/or in a case where t is an integer of from 2 to 8, the respective $R^{11}$'s are independently a $C_{2-4}$ alkylene group.

In the formula (2), s is an integer of from 1 to 250, preferably an integer of from 5 to 100. In a case where t is from 2 to 8, the respective s's are independently an integer of from 1 to 250.

According to the novel silyl group-containing polymer represented by the above formula (2), quick and strong curing is possible, and antifouling properties and weather resistance of a cured product containing such a silyl group-containing polymer can be improved. Further, the above silyl group-containing polymer represented by the above formula (2) has a lower viscosity than the silyl group-containing polymer represented by the above formula (1) and is thereby excellent in handling efficiency.

Now, a favorable process for producing the silyl group-containing polymer of the present invention will be described.

The process for producing the silyl group-containing polymer of the present invention comprises a first step and a second step. Now, the respective steps will be described in further detail.

(First Step)

In the first step, a polyester ether polyol which is an intermediate of the silyl group-containing polymer of the present invention is prepared. The polyester ether polyol is obtained by reacting a $C_{3-9}$ cyclic ester and a $C_{2-4}$ alkylene oxide in the presence of a monohydroxy or polyhydroxy compound having from 1 to 8 hydroxyl group(s) in its molecule (initiator), in the presence of a polymerization catalyst.

(Monohydroxy or Polyhydroxy Compound Having from 1 to 8 Hydroxyl Group(s) in its Molecule)

The monohydroxy or polyhydroxy compound having from 1 to 8 hydroxyl group(s) in its molecule to be used as the initiator may, for example, be specifically a monohydric alcohol such as methanol, ethanol, 2-propanol, normal butanol, iso-butanol, 2-ethylhexanol, decyl alcohol, lauryl alcohol, tridecanol, cetyl alcohol, stearyl alcohol or oleyl alcohol; water; a dihydric alcohol such as ethylene glycol, diethylene glycol, propylene glycol, dipropylene glycol, 1,3-propanediol, 1,4-cyclohexanediol, 1,3-butanediol, 1,4-butanediol, 1-6-hexanediol or 1,4-cyclohexanediol; a polyhydric alcohol such as glycerol, diglycerol, trimethylolpropane, pentaerythritol, dipentaerythritol or tripentaerythritol; a saccharide or its derivative such as glucose, sorbitol, dextrose, fructose, sucrose or methyl glycoside; or a phenol compound such as bisphenol A, bisphenol F, bisphenol S, novolak, resole or resorcine. The above initiators may be used alone or in combination of two or more. Further, a polyoxyalkylene polyol obtained by reacting an alkylene oxide with such a compound may also be used. In a case where an initiator having one hydroxyl group is used, it is preferably used in combination with another initiator having two or more hydroxyl groups.

Initiators differing in the hydroxyl group may be mixed an then an alkylene oxide and a cyclic ester are reacted, or an alkylene oxide and a cyclic ester are reacted with the respective initiators and then mixed. When an alkylene oxide or a cyclic ester is reacted with an initiator having one hydroxyl group, an effect of lowering the coefficient of elasticity of a cured product will be obtained, and such is favorable for an application which requires a low coefficient of elasticity. It is preferred to react an alkylene oxide or a cyclic ester with an initiator having one hydroxyl group and to add the reaction product to one similarly prepared by using another initiator, in view of adjustment of physical properties and adjustment of the viscosity.

Further, the above initiator is preferably a polyether polyol represented by the following formula (3) from the viewpoint of easiness of production;

(3)

In the formula (3), $R^{10}$ is a $C_{1-20}$ t-valent hydrocarbon group. Particularly, it is preferably a $C_{1-10}$ t-valent hydrocarbon group. In the formula (3), t is an integer of from 1 to 8. t is preferably an integer of from 1 to 3, more preferably an inter of from 2 to 3.

In the formula (3), $R^{11}$ is a $C_{2-4}$ alkylene group. In a case where the initiator represented by the formula (3) has a plurality of $R^{11}$'s in its molecule, the respective $R^{11}$'s may be the same or different. Namely, in a case where s is an integer of from 2 to 250 and/or in a case where t is an integer of from 2 to 8, the respective $R^{11}$'s are independently a $C_{2-4}$ alkylene group.

In the formula (3), s is an integer of from 1 to 250. s is preferably an integer of from 5 to 100. In a case where t is from 2 to 8, the respective s's are independently an integer of from 1 to 250.

In a case where the polyether polyol is used as the initiator, the molecular weight distribution (Mw/Mn) of the initiator is preferably at most 3.0, more preferably at most 2.0. In such a case, when the content of the initiator in the silyl group-containing polymer represented by the above formula (1) is at least 50 mass %, the molecular weight distribution (Mw/Mn) of the obtained silyl group-containing polymer can be made to be at most 1.4, whereby the silyl group-containing polymer has a small molecular weight distribution and thereby has a low viscosity.

(Cyclic Ester)

The cyclic ester used in the present invention has from 3 to 9 carbon atoms.

Particularly, the cyclic ester is preferably β-propiolactone (number of carbon atoms: 3), δ-valerolactone (number of carbon atoms: 5) or ε-caprolactone (number of carbon atoms: 6), more preferably ε-caprolactone. Such a cyclic ester may be a monomer, a dimmer or a trimer, and is preferably a monomer from the viewpoint of reactivity. Such cyclic esters may be used alone or in combination of two or more.

The content of the bivalent group represented by the above formula (A) derived from the cyclic ester in the polyester ether polyol is preferably from 5 to 50 mass %, more preferably from 5 to 40 mass %. If the content of the cyclic ester is less than 5 mass %, weather resistance of a cured product containing the silyl group-containing polymer tends to be insufficient as compared with a case where the content is within the above range. Further, if the content of the cyclic ester exceeds 50 mass %, the viscosity of the polyester ether polyol tends to be high as compared with a case where the content is within the above range.

(Alkylene Oxide)

The alkylene oxide used in the present invention has from 2 to 4 carbon atoms.

The above alkylene oxide may, for example, be ethylene oxide, propylene oxide, 1,2-butylene oxide, 2,3-butylene oxide or oxetane. Such alkylene oxides may be used alone or in combination of two or more.

Among them, it is preferred to use at least one member selected from ethylene oxide and propylene oxide.

The content of the bivalent group represented by the above formula (B) derived from the alkylene oxide in the polyester ether polyol is preferably from 50 to 95 mass %, more preferably from 60 to 95 mass %. If the content of the group derived from the alkylene oxide is less than 50 mass %, the viscosity of the polyester ether polyol tends to be high as compared with a case where the content is within the above range. Further, if the content of the group derived from the alkylene oxide exceeds 95 mass %, is weather resistance of a cured product containing the silyl group-containing polymer tends to be insufficient as compared with a case where the content is within the above range. The content of the group derived from the alkylene oxide is a value including groups derived from the alkylene oxide contained in the initiator.

(Polymerization Catalyst)

In the present invention, when the initiator, the cyclic ester and the alkylene oxide are polymerized, a polymerization catalyst is used. The polymerization catalyst is not particularly limited, and specifically, it may, for example, be (1) a double metal cyanide complex catalyst or (2) a compound catalyst having a P=N bond represented by a hydroxide salt of phosphazenium cation.

Among the above polymerization catalysts, it is preferred to use a double metal cyanide complex catalyst, a cesium compound catalyst or a compound catalyst having a P=N bond, and it is more preferred to use a double metal cyanide complex catalyst. In the first step, when a double metal cyanide complex catalyst is used, the polyester ether polyol to be obtained will have a high molecular weight since activity of the double metal cyanide complex catalyst is high. A silyl group-containing polymer containing a polyester ether polyol having a high molecular weight is excellent in curing properties, and a cured product containing such a silyl group-containing polymer is excellent in mechanical properties such as elongation.

Further, in the first step, when a double metal cyanide complex catalyst is used, the copolymerization reaction rate can be increased, and a high molecular weight polyester ether polyol having a narrow molecular weight distribution can be produced. A silyl group-containing polymer containing a high molecular weight polyester ether polyol having a narrow molecular weight distribution has low viscosity and is thereby excellent in workability such as handling efficiency.

The double metal cyanide complex catalyst (1) is preferably a complex containing zinc hexacyanocobaltate as the main component which has high polymerization activity. Further, the double metal cyanide complex catalyst preferably has an organic ligand, and the organic ligand is more preferably an ether, an alcohol or the like, whereby the catalyst has high activity.

The ether is preferably at least one member selected from the group consisting of ethylene glycol dimethyl ether (glyme), diethylene glycol dimethyl ether (diglyme) and triethylene glycol dimethyl ether, whereby the complex will easily be handled at the time of polymerization reaction, and among them, glyme is more preferred, whereby the complex will more easily be handled at the time of polymerization reaction.

The alcohol is preferably tert-butyl alcohol or a mixture of tert-butyl alcohol with at least one member selected from the group consisting of n-butyl alcohol, sec-butyl alcohol, iso-butyl alcohol, tert-pentyl alcohol, iso-pentyl alcohol, N,N-dimethylacetamide and ethylene glycol mono-tert-butyl ether. In such a case, since the polymerization catalyst has high activity, the amount of the polymerization catalyst can be reduced, whereby the amount of the catalyst remaining in the silyl group-containing polymer will be reduced. When tert-butyl alcohol is used as the alcohol, the copolymerization reaction rate of the cyclic ester with the alkylene oxide can be increased, and a silyl group-containing polymer having a narrow molecular weight distribution can be obtained.

The amount of use of the double metal cyanide complex catalyst is preferably from 1 to 500 ppm based on the entire mass of the polyester ether polyol to be obtained, more preferably from 1 to 100 ppm, whereby the product is excellent in storage stability and such an amount is economically advantageous.

If the amount of the double metal cyanide complex catalyst remaining in the polyester ether polyol is large, operation of removing the double metal cyanide complex catalyst from the obtained polyester ether polyol may be carried out after completion of the first step, or the double metal cyanide complex catalyst may not be removed and the second step is carried out as it is.

On the other hand, when the amount of the double metal cyanide complex catalyst remaining in the polyester ether polyol is small and the catalyst will not adversely affect the following procedure, the next step may be conducted without a step of removing the double metal cyanide complex catalyst. In such a case, the number of steps can be reduced by further reducing the amount of the double metal cyanide complex catalyst, whereby the production efficiency of the polyester ether polyol can be increased.

Such a double metal cyanide complex catalyst can be produced by a known production process. For example, a halogenated metal salt and cyanometalate are reacted in water, the obtained reaction product is washed with an aqueous solution of the above organic ligand or the organic ligand in the liquid form, the obtained cake (solid component) is separated by filtration, and the cake is further dried to obtain a double metal cyanide complex catalyst in the solid form.

Otherwise, a halogenated metal salt and an alkali metal cyanometalate are reacted, and the obtained reaction product is washed with an aqueous solution of the above organic ligand or the organic ligand in the liquid form, and then the reaction product is dispersed in a polyether polyol. Then, water in an excess amount and the organic ligand in the liquid form are distilled off from the dispersion liquid to obtain a double metal cyanide complex catalyst in the form of a slurry having the double metal cyanide complex catalyst dispersed in the polyether polyol.

The polyether monool or polyether polyol to be used for preparation of the above double metal cyanide complex catalyst in the form of a slurry is prepared by subjecting an alkylene oxide to ring-opening addition polymerization to a monoalcohol or polyhydric alcohol using an ionic polymerization catalyst (anionic polymerization catalyst, cationic polymerization catalyst). The polyether monool or polyether polyol preferably has from 1 or 2 to 8 hydroxyl groups and has a number average molecular weight of from 300 to 5,000.

The compound catalyst having a P=N bond (2) may, for example, be a phosphazenium compound, a phosphazene compound or a phosphine oxide compound. As the phosphazenium compound, compounds disclosed in JP-A-11-106500 may be mentioned. Specifically, tetrakis[tris(dimethylamino)phosphoranylideneamino]-phosphonium hydroxide, tetrakis[tris(dimethylamino)-phosphoranylideneamino]phosphonium methoxide, tetrakis[tris(dimethylamino)phosphoranylideneamino]-phosphonium ethoxide or tetrakis[tri(pyrrolidin-1-yl)phosphoranylideneamino]phosphonium tert-butoxide may, for example, be mentioned.

As the phosphazene compound, compounds disclosed in JP-A-10-36499 may be mentioned. Specifically, 1-tert-butyl-2,2,2-tris(dimethylamino)phosphazene, 1-(1,1,3,3-tetramethylbutyl)-2,2,2-tris(dimethylamino)phosphazene, 1-ethyl-2,2,4,4,4-pentakis(dimethylamino)-$2\lambda^5,4\lambda^5$-catenadi (phosphazene), 1-tert-butyl-4,4,4-tris(dimethylamino)-2,2-bis[tris(dimethylamino)phosphoranylideneamino]-$2\lambda^5,4\lambda^5$-catenadi(phosphazene), 1-(1,1,3,3-tetramethylbutyl)-4,4,4-tris(dimethylamino)-2,2-bis[tris(dimethylamino) phosphoranylideneamino]-$2\lambda^5,4\lambda^5$-catenadi(phosphazene), 1-tert-butyl-2,2,2-tri(1-pyrrolidinyl)phosphazene or 7-ethyl-5,11-dimethyl-1,5,7,11-tetraaza-$6\lambda^5$-phosphaspiro[5,5]undec-1(6)-ene may, for example, be mentioned.

As the phosphine oxide compound, compounds disclosed in JP-A-11-302371 may be mentioned. Specifically, tris[tris(dimethylamino)phosphoranylideneamino]phosphine oxide or tris[tris(diethylamino)phosphoranylideneamino]-phosphine oxide may, for example, be mentioned.

Among them, it is preferred to use a phosphazenium compound or a phosphine oxide compound from the viewpoint of availability.

In a case where the compound catalyst having a P=N bond is used as the polymerization catalyst, the amount of use of the compound having a P=N bond is preferably from $1 \times 10^{-4}$ to $5 \times 10^{-1}$ mol equivalent, more preferably from $1 \times 10^{-4}$ to $2 \times 10^{-1}$ mol equivalent per 1 mol equivalent of active hydrogen atoms in the initiator. When the amount of use of the compound catalyst having a P=N bond based on active hydrogen atoms in the initiator is at least $1 \times 10^{-4}$ mol equivalent, the copolymerization reaction rate of the cyclic ester with the alkylene oxide can be increased, and when it is at most $5 \times 10^{-1}$ mol equivalent, the production cost can be suppressed.

In the above first step, when the compound catalyst having a P=N bond (2) is used as a polymerization catalyst, if this catalyst remains in the polyester ether polyol, the polyester ether polyol tends to be colored and accordingly, it is preferred to remove the catalyst component after production of the polyester ether polyol.

In the first step, the contents and the types of the cyclic ester and the alkylene oxide during the reaction can be adjusted by the purpose of use of the silyl group-containing polymer. Further, conditions for production of the polyester ether polyol i.e. the stirring efficiency, the supply rates of the cyclic ester and the alkylene oxide, the reaction temperature and the presence or absence of the solvent are not particularly limited and can be determined depending upon the desired physical properties and production efficiency of the polyester ether polyol.

In the first step, for example, when a random copolymer chain of the cyclic ester and the alkylene oxide is to be obtained, the cyclic ester and the alkylene oxide are mixed and reacted. In such a case, the mixing ratio is such that the cyclic ester/alkylene oxide (mass ratio) will be from 5 to 70/95 to 30 (mass ratio).

The polyester ether polyol is obtained in the above-described first step of reacting the initiator, the cyclic ester and the alkylene oxide in the presence of the polymerization catalyst.

In the first step, a plural types of the cyclic esters and the alkylene oxides may be simultaneously added and subjected to polymerization reaction, or the cyclic ester and the alkylene oxide may be mixed and the mixture is added and subjected to polymerization. Further, addition of the cyclic ester and the alkylene oxide to a reactor may be either addition from a liquid phase or addition from a gas phase.

In the present invention, by simultaneously adding the initiator, at least one type of the alkylene oxide and at least one type of the cyclic ester compound to a reactor in the presence of the double metal cyanide complex catalyst for polymerization reaction, a polyester ether polyol having a random copolymer chain is obtained (random copolymerization).

Further, by adding the initiator and the double metal cyanide complex catalyst to a reactor and then adding at least one type of the alkylene oxide and at least one type of the cyclic ester in this order, a polyether ester polyol having a block copolymer chain is obtained (block copolymerization).

Further, by adding the initiator and the double metal cyanide complex catalyst to a reactor and then simultaneously adding a cyclic ester polymer obtained by polymerization of a predetermined amount of at least one type of the cyclic ester and an alkylene oxide polymer obtained by polymerization of a predetermined amount of at least one type of the alkylene oxide, a polyester ether polyol having a random copolymer chain and a block copolymer chain present in the same molecule is obtained (random/block copolymerization).

Among them, the polyester ether polyol preferably has a random or random/block copolymer chain, more preferably has a random copolymer chain.

In a case where the polyester ether polyol has a random copolymer chain, the content of the random copolymer chain of the cyclic ester and the alkylene oxide in the polyester ether polyol is preferably from 10 to 95 mass %, more preferably from 20 to 90 mass %. If the content of the random copolymer chain is less than 10 mass %, a silyl group-containing polymer to be obtained tends to be poor in weather resistance as compared with a case where the content is within the above range. Further, if the content of the random copolymer chain exceeds 95 mass %, the polyester ether polyol tends to have a high viscosity and its handling is difficult in some cases as compared with a case where the content is within the above range.

The polyester ether polyol obtained in the first step has a number average molecular weight of preferably from 2,000 to 30,000, more preferably from 5,000 to 25,000, furthermore preferably from 8,000 to 22,000. If the number average molecular weight of the polyester ether polyol is less than 2,000, as compared with a case where the number average molecular weight is within the above range, the number of units of the cyclic ester is small, whereby a cured product containing a silyl group-containing polymer tends to have insufficient weather resistance or its surface tends to be sticky. Further, if the number average molecular weight exceeds 30,000, the polyester ether polyol has a high viscosity and can not practically be used in some cases, as compared with a case where the number average molecular weight is within the above range.

The molecular weight distribution (Mw/Mn) of the polyester ether polyol is preferably at most 2.0, more preferably from 1.02 to 1.4, furthermore preferably from 1.02 to 1.35. If the molecular weight distribution exceeds 2.0, the viscosity of the polyester ether polyol tends to be too high as compared with a case where the molecular weight distribution is within the above range. Further, if the molecular weight distribution of the polyester ether polyol is less than 1.02, the polymerization reaction will take long, whereby the production efficiency tends to be decrease.

The polyester ether polyol may be used in combination with another polyol. The blend ratio of the polyester ether polyol and another polyol in such a case is not particularly limited so long as properties of the polyester ether polyol are deteriorated. Preferably, the amount of the polyol is from 5 to 200 parts by mass per 100 parts by mass of the polyester ether polyol. Within this range, a cured product to be obtained will has little surface tack and will be excellent in weather resistance.

As the above another polyol, a polyether polyol may be mentioned, whereby a silyl group-containing polymer to be obtained has a reduced viscosity while maintaining performance of the silyl group-containing polymer.

(Second Step)

Now, the second step will be described. In the second step, the silyl group-containing polymer of the present invention is prepared from the polyester ether polyol obtained in the first step. The silyl group-containing polymer is obtained by reacting the polyester ether polyol and a silyl isocyanate compound in the presence of a urethane-forming catalyst.

(Silyl Isocyanate Compound)

The silyl isocyanate compound is represented by the following formula (4):

In the formula (4), $R^2$ is a bivalent organic group. Particularly, $R^2$ is preferably a $C_{1-17}$ bivalent hydrocarbon group, more preferably a trimethylene group ($-CH_2CH_2CH_2-$). In such a case, curing properties and the storage stability are well balanced.

In the above formula (4), the above $R^2$ is preferably bonded to the Si atom at the α-position of $R^2$, and this $R^2$ is more preferably a methylene group ($-CH_2-$). In such a case, the curing rate of the silyl group-containing polymer can be further increased.

In the formula (4), $R^3$ is independently a $C_{1-20}$ monovalent organic group which may have a substituent. X is a hydroxyl group or a hydrolysable group, and "a" is an integer of from 1 to 3.

The hydrolysable group may be a $-OR$ group. The $-OR$ group is preferably an alkoxy group or an alkenyl group having at most 4 carbon atoms. Specifically, a methoxy group, an ethoxy group, a propoxy group or a propenyl group may, for example, be mentioned. Among them, the $-OR$ group is more preferably a methoxy group or an ethoxy group. In such a case, the curing rate of the silyl group-containing polymer can be further increased.

Such a silyl isocyanate compound may be an isocyanate silane compound such as α-isocyanatemethyltrimethoxysilane, β-isocyanateethyltrimethoxysilane, γ-isocyanatepropyltrimethoxysilane, γ-isocyanatebutyltrimethoxysilane, γ-isocyanatepentyltrimethoxysilane, α-isocyanatemethyltriethoxysilane, β-isocyanateethyltriethoxysilane, γ-isocyanatepropyltriethoxysilane, γ-isocyanatebutyltriethoxysilane, γ-isocyanatepentyltriethoxysilane, α-isocyanatemethylmethyldimethoxysilane, α-isocyanateethyldimethoxysilane, α-isocyanatepropyltrimethoxysilane or α-isocyanatepropyltriethoxysilane. Among them, preferred is γ-isocyanatepropyltrimethoxysilane, γ-isocyanatepropyltriethoxysilane or α-isocyanatemethylmethyldimethoxysilane.

(Urethane-forming Catalyst)

In the present invention, for the reaction of the polyester ether polyol and the silyl isocyanate compound, a urethane-forming catalyst is used. As the urethane-forming catalyst, a known urethane-forming catalyst is used. Specifically, a tin catalyst or a bismuth catalyst may be mentioned. Further, in the present invention, a double metal cyanide complex catalyst or the like may also be used. The double metal cyanide complex catalyst is as defined for the double metal cyanide complex catalyst described in the first step. Particularly, it is preferred to use the double metal cyanide complex catalyst, more preferred to use the same double metal cyanide complex catalyst as the above-described polymerization catalyst. Namely, it is preferred to react the polyester ether polyol and the silyl isocyanate compound in the presence of the double metal cyanide complex catalyst used in the first step to obtain the silyl group-containing polymer of the present invention.

In such a case, the amount and the activity of the double metal cyanide complex catalyst contained in the first step are adjusted so that the activity of the double metal cyanide complex catalyst remains even after completion of the first step, whereby the second step can be carried out as it is. Namely, it is possible to allow the reaction to proceed without newly adding a urethane-forming catalyst.

Accordingly, in the second step, a Sn catalyst which is a commonly used urethane-forming catalyst is unnecessary, whereby remaining of the Sn catalyst in the silyl group-containing polymer to be obtained can be prevented.

Further, in such a case, the first step and the second step can be carried out continuously, whereby workability will improve, and the yield of the silyl group-containing polymer to be obtained will improve.

The amount of use of the urethane-forming catalyst used in the second step may be any amount so long as it is necessary for urethane-forming reaction of the polyester ether polyol with the silyl isocyanate compound and is preferably at most 100 ppm based on the entire mass of the silyl group-containing polymer, more preferably at most 50 ppm. If the amount of use of the urethane-forming catalyst exceeds 100 ppm, a large amount of the urethane-forming catalyst will remain in the silyl group-containing polymer, whereby the silyl group-containing polymer tends to have reduced storage stability.

As conditions for production of the silyl group-containing polymer, the reaction temperature and the time over which the reaction is completed vary depending upon the amount of use of the urethane-forming catalyst, but the reaction is preferably carried out at a temperature of usually from 20 to 200° C., preferably from 50 to 150° C. for several hours. This reaction is carried out preferably in an inert gas such as nitrogen gas or argon gas. In such a case, side reaction can be inhibited, whereby the yield of the silyl group-containing polymer to be obtained will be improved.

According to this second step, the number of steps is small as compared with, for example, a method of reacting the polyester ether polyol with the polyisocyanate compound in excess of isocyanate groups and silylating isocyanate groups remaining at the terminal of the polyester ether polyol, whereby the process time can be remarkably shortened, and impurities formed as by-products during the production process can be reduced. Further, according to the second step, the silyl group-containing polymer will be excellent in storage stability, and complicated operation such as purification is unnecessary. Further, according to the second step, in which the silyl isocyanate compound is directly subjected to urethane-forming reaction to the terminal hydroxyl groups of the polyester ether polyol, complicated steps for preparation of the polymer can be simplified.

In the second step, the blend ratio of the polyester ether polyol and the silyl isocyanate compound is not particularly limited, and it is preferred to carry out the reaction by adjusting the amount of the isocyanate groups (NCO) in the silyl isocyanate compound to the number of hydroxyl groups (OH) in the polyester ether polyol to be NCO/OH=0.6 to 1.2 by the molar ratio, more preferably NCO/OH=0.95 to 1.10 by the molar ratio, furthermore preferably NCO/OH=0.95 to 1.05 by the molar ratio. If NCO/OH is less than 0.6 by the molar ratio, the number of isocyanate groups in the silyl isocyanate compound is small, and the hydroxyl groups in the polyester ether polyol tends to remain, whereby the silyl group-containing polymer tends to have reduced storage stability, as compared with a case where the molar ratio is within the above range.

In such a case, the silyl isocyanate compound or a monoisocyanate compound is newly added to consume the remaining OH groups. Specifically, the NCO/OH is calculated from the hydroxyl value of the obtained polyester ether polyol and the amount of the silyl isocyanate added, and the silyl isocyanate compound or the like is further added so that the molar ratio will be within the above range.

As described above, the silyl group-containing polymer is obtained by subjecting the silyl isocyanate compound to urethane-forming reaction to the polyester ether polyol.

The silyl group-containing polymer of the present invention can be cured quickly and strongly, and has physical properties such as a short adhesion time at room temperature and high tensile strength while maintaining favorable rubber elasticity. Further, a cured product containing such a silyl group-containing polymer has little surface tack and is thereby excellent in antifouling properties, and has high weather resistance. Thus, the silyl group-containing polymer of the present invention is suitably used in the fields of a covering composition and a sealing composition such as an adhesive, an elastic adhesive, a sealant, a waterproof material and a coating agent.

Further, the silyl group-containing polymer of the present invention may be formed into a curable composition in combination with additives.

(Additives)

Now, additives which can be added to the silyl group-containing polymer of the present invention will be described.

(Curing Catalyst)

The silyl group-containing polymer of the present invention may be combined with a curing accelerator (curing catalyst) to accelerate hydrolysis of the reactive silicon group and/or crosslinking reaction to be formed into a curable composition.

Specific examples of the curing catalyst include tin compounds such as organotin carboxylates such as dibutyltin diacetate, dibutyltin dilaurate, dioctyltin dilaurate, $(n-C_4H_9)_2Sn(OCOCH=CHCOOCH_3)_2$, $(n-C_4H_9)_2Sn(OCOCH=CHCOO(n-C_4H_9))_2$, $(n-C_8H_{17})_2Sn$ (OCOCH=CHCOOCH$_3$)$_2$, (n-C$_8$H$_{17}$)$_2$Sn(OCOCH=CHCOO(n-C$_4$H$_9$))$_2$ and (n-C$_8$H$_{17}$)$_2$Sn(OCOCH=CHCOO(iso-C$_8$H$_{17}$))$_2$; sulfur-containing organotin compounds such as (n-C$_4$H$_9$)$_2$Sn(SCH$_2$COO), (n-C$_8$H$_{17}$)$_2$Sn(SCH$_2$COO), (n-C$_8$H$_{17}$)$_2$Sn(SCH$_2$CH$_2$COO), (n-C$_8$H$_{17}$)$_2$Sn(SCH$_2$COOCH$_2$CH$_2$OCOCH$_2$S), (n-C$_4$H$_9$)$_2$Sn(SCH$_2$COO(iso-C$_8$H$_{17}$))$_2$, (n-CH$_8$H$_{17}$)$_2$Sn(SCH$_2$COO(iso-C$_8$H$_{17}$))$_2$, (n-C$_8$H$_{17}$)$_2$Sn (SCH$_2$COO (n-C$_8$H$_{17}$))$_2$ and (n-C$_4$H$_9$)$_2$SnS; organotin oxides such as (n-C$_4$H$_9$)$_2$SnO and a(n-C$_8$H$_{17}$)$_2$SnO; reaction products of the above organotin oxide with an ester compound selected from the group consisting of ethyl silicate, dimethyl maleate, diethyl maleate, dioctyl maleate, dimethyl phthalate, diethyl phthalate and dioctyl phthalate; chelate tin compounds such as (n-C$_4$H$_9$)$_2$Sn(acac)$_2$, (n-C$_8$H$_{17}$)$_2$Sn(acac)$_2$, (n-C$_4$H$_9$)$_2$Sn(OC$_8$H$_{17}$)(acac), (n-C$_4$H$_9$)$_2$Sn (OC(CH$_3$)CHCO$_2$C$_2$H$_5$)$_2$, (n-C$_8$H$_{17}$)$_2$Sn(OC(CH$_3$)CHCO$_2$C$_2$H$_5$)$_2$, (n-C$_4$H$_9$)$_2$Sn(OC$_8$H$_{17}$)(OC(CH$_3$)CHCO$_2$C$_2$H$_5$) and tin bisacetylacetonate (the above acac is an acetylacetonate ligand, and OC(CH$_3$)CHCO$_2$C$_2$H$_5$ is an ethyl acetoacetate ligand); reaction products of the above chelate tin compound with an alkoxysilane selected from the group consisting of teteramethoxysilane, tetraethoxysilane and tetrapropoxysilane; and —SnOSn— bond-containing organotin compounds such as (n-C$_4$H$_9$)$_2$ (CH$_3$COO)SnOSn(OCOCH$_3$) (n-C$_4$H$_9$)$_2$ and (n-C$_4$H$_9$)$_2$(CH$_3$O)SnOSn(OCH$_3$) (n-C$_4$H$_9$)$_2$.

Further, a bivalent tin carboxylate such as tin 2-ethylhexanoate, tin n-octylate, tin naphthenate or tin stearate; a metal salt other than tin of an organic carboxylic acid such as octylic acid, oleic acid, naphthenic acid or stearic acid; calcium carboxylate, zirconium carboxylate, iron carboxylate, vanadium carboxylate, bismuth carboxylate such as bismuth tris-2-ethylhexoate, lead carboxylate, titanium carboxylate, nickel carboxylate or the like; a titanium alkoxide such as tetraisopropyl titanate, tetrabutyl titanate, tetramethyl titanate or tetra(2-ethylhexyl titanate); an aluminum alkoxide such as aluminum isopropylate or mono-sec-butoxyaluminum diisopropylate; a zirconium alkoxide such as zirconium-n-propylate or zirconium-n-butyrate; a titanium chelate such as titanium tetraacetylacetonate, titanium ethyl acetoacetate, titanium octylene glycolate or titanium lactate; an aluminum chelate such as aluminum trisacetylacetonate, aluminum tricetyl acetoacetate or diisopropoxyaluminum ethylacetoacetate; a zirconium compound such as zirconium tetraacetylacetonate, zirconium bisacetylacetonate, zirconium acetylacetonate bisethylacetoacetate or zirconium acetate; an acidic compound such as phosphoric acid, p-toluenesulfonic acid or phthalic acid, an aliphatic monoamine such as butylamine, hexylamine, octylamine, decylamine or laurylamine; an aliphatic diamine such as ethylenediamine or hexanediamine; an aliphatic polyamine such as diethylenetriamine, triethylenetetramine or tetraethylenepentamine; a heterocyclic amine such as piperidine or piperazine; an aromatic amine such as m-phenylenediamine; an alkanolamine such as monoethanolamine, diethanolamine or triethanolamine; a trialkylamine such as triethylamine; or an amine compound such as a modified amine to be used as a curing agent for an epoxy resin, may, for example, be mentioned.

These compounds may be used alone or in combination of two or more. When two or more compounds are used in combination, for example, it is preferred to combine the above metal-containing compound such as a reaction product of the above bivalent tin carboxylate, organotin carboxylate or organotin oxide with an ester compound, and the above aliphatic monoamine or another amine compound, whereby excellent curing properties will be obtained.

When the curing catalyst is combined with the silyl group-containing polymer of the present invention, the ratio of use of the curing catalyst is preferably from 0.001 to 10 parts by mass, more preferably from 0.01 to 5 parts by mass per 100 parts by mass of the silyl group-containing polymer. When the ratio of use of the curing catalyst is at least 0.001 part by mass, the curing rate of the curable composition can be effectively accelerate, and when the ratio of use of the curing catalyst is at most 10 parts by mass, the usable time at the time of use can be secured.

The above curable composition may be of a one pack type wherein the curing catalyst is preliminarily added and stored under dehydrated conditions, and is reacted with moisture in the air at the time of curing, or may be of a two pack type wherein the curing catalyst is mixed immediately before curing and used for curing.

(Filler)

The silyl group-containing polymer of the present invention may be combined with a filler to be formed into a curable composition. Such a filler may, for example, be a powdery filler such as calcium carbonate surface treated with an aliphatic acid or a resin acid type organic matter, colloidal calcium carbonate having an average particle size of at most 1 μm, having the above calcium carbonate further pulverized, precipitated calcium carbonate having an average particle size of from 1 to 3 μm prepared by precipitation method, heavy calcium carbonate having an average particle size of from 1 to 20 μm, another calcium carbonate, fumed silica, precipitated silica, silicic anhydride, hydrated silicic acid, carbon black, magnesium carbonate, diatomaceous earth, calcined clay, clay, talc, titanium oxide, bentonite, organic bentonite, ferric oxide, zinc oxide, active zinc flour, shirasu balloon, glass balloon, plastic balloon, wood flour, pulp, cotton chips, mica, walnut shell flour, rice husk flour, graphite, aluminum impalpable powder or flint powder; or a fibrous filler such as glass fibers, glass filaments, carbon fibers, Kevlar fibers or polyethylene fibers. Among them, it is preferred to use plastic balloon, whereby the specific gravity of the curable composition can be made low.

When the silyl group-containing polymer of the present invention is combined with the filler, the ratio of use of the filler is preferably at most 1,000 parts by mass, more preferably from 50 to 250 parts by mass per 100 parts by mass of the silyl group-containing polymer. The fillers may be used alone or in combination of two or more.

(Plasticizer)

The silyl group-containing polymer of the present invention may be combined with a plasticizer to be formed into a curable composition. Such a plasticizer may, for example, be a polymer plasticizer such as a phthalate ester such as dibutyl phthalate, butylbenzyl phthalate or bis-2-ethylhexyl phthalate; an aliphatic carboxylate such as dioctyl adipate, bis(2-methylnonyl)succinate, dibutyl sebacate or butyl oleate; an alcohol ester such as pentaerythritol ester; a phosphate ester such as tiroctyl phosphate or tricresyl phosphate; an epoxy plasticizer such as epoxidized soybean oil, dioctyl 4,5-epoxyhexahydrophthalate or benzyl epoxystearate; chlorinated paraffin; a polyester plasticizer such as a polyester obtained by reacting a dibasic acid with a dihydric alcohol; a polyether such as polyoxypropylene glycol or its derivative; a styrene oligomer such as poly-α-methylstyrene or polystyrene; or an oligomer such as polybutadiene, a butadiene/acrylonitrile copolymer, polychloroprene, polyisoprene, polybutene, hydrogenated polybutene or epoxidized polybutadiene.

When the silyl group-containing polymer of the present invention is combined with the plasticizer, the ratio of use of the plasticizer is preferably at most 1,000 parts by mass, more preferably from 1 to 300 parts by mass per 100 parts by mass of the silyl group-containing polymer. The fillers may be used alone or in combination of two or more.

When the curable composition is used for an application such as an adhesive, the adhesion between a cured product of the curable composition and a substrate improves in some cases without a plasticizer.

(Adhesion-imparting Agent)

The silyl group-containing polymer of the present invention may be combined with an adhesion-imparting agent to be formed into a curable composition for the purpose of improving the adhesion between a substrate and the silyl group-containing polymer. Such an adhesion-imparting agent may, for example, be a silane coupling agent such as a (meth) acryloyloxy group-containing silane, an amino group-containing silane, a mercapto group-containing silane, an epoxy group-containing silane or a carboxyl group-containing silane.

The (meth)acryloyloxy group-containing silane may, for example, be 3-methacryloyloxypropyltrimethoxysilane, 3-acryloyloxypropyltrimethoxysilane or 3-methacryloyloxypropylmethyldimethoxysilane.

The amino group-containing silane may, for example, be 3-aminopropyltrimethoxysilane, 3-aminopropyltriethoxysilane, 3-aminopropylmethyldimethoxysilane, N-(2-aminoethyl)-3-aminopropyltrimethoxysilane, N-(2-aminoethyl)-3-aminopropylmethyldimethoxysilane, N-(2-aminoethyl)-3-aminopropyltriethoxysilane, 3-ureidopropyltriethoxysilane, N-(N-vinylbenzyl-2-aminoethyl)-3-aminopropyltrimethoxysilane or 3-anilinopropyltrimethoxysilane.

The mercapto group-containing silane may, for example, be 3-mercaptopropyltrimethoxysilane, 3-mercaptopropyltriethoxysilane, 3-mercaptopropylmethyldimetoxylsilane or 3-mercaptopropylmethyldiethoxysilane.

The epoxy group-containing silane may, for example, be 3-glycidyloxypropyltrimethoxysilane, 3-glycidyloxypropylmethyldimethoxysilane or 3-glycidyloxypropyltriethoxysilane.

The carboxyl group-containing silane may, for example, be 2-carboxyethyltriethoxysilane, 2-carboxyethylphenylbis(2-methoxyethoxy)silane or N-(N-carboxymethyl-2-aminoethyl)-3-aminopropyltrimethoxysilane.

Further, the adhesion-imparting agent may be a reaction product obtained by reacting two or more silane coupling agents. Such a reaction product may, for example, be a reaction product of an amino group-containing silane with an epoxy group-containing silane, a reaction product of an amino group-containing silane with a (meth)acrloyloxy group-containing silane, a reaction product of an epoxy group-containing silane with a mercapto group-containing silane, or a reaction product of mercapto group-containing silanes. Such a reaction product can easily be obtained by mixing the silane coupling agents, followed by stirring at a temperature of from room temperature to 150° C. for from 1 to 8 hours. The adhesion-imparting agents may be used alone or in combination of two or more.

When the silyl group-containing polymer of the present invention is combined with the adhesion-imparting agent, the ratio of use of the adhesion-imparting agent is preferably from 0 to 30 parts by mass, more preferably from 0.1 to 10 parts by mass per 100 parts by mass of the silyl group-containing polymer.

Further, the adhesion-imparting agent may be an epoxy resin or a mixture of an epoxy resin with an epoxy resin curing agent. The epoxy resin is not particularly limited, and a commonly known epoxy resin may be used. The epoxy resin may, for example, be a commonly used epoxy resin or a vinyl polymer containing an epoxy group, such as a flame retardant epoxy resin such as a bisphenol A/diglycidyl ether epoxy resin, a bisphenol F/diglycidyl ether epoxy resin or a tetrabromobisphenol A/glycidyl ether epoxy resin, a glycidyl ether epoxy resin such as a novolak epoxy resin, a hydrogenated bisphenol A epoxy resin or a bisphenol A/propylene oxide addition product, a diglycidyl ester epoxy resin such as glycidyl 4-glycidyloxybenzoate, diglycidyl phthalate, diglycidyl tetrahydrophthalate or diglycidyl hexahydrophthalate, a m-aminophenol epoxy resin, a diaminodiphenylmethane epoxy resin, a urethane-modified epoxy resin, an alicyclic epoxy resin, N,N-diglycidylaniline, N,N-diglycidyl-o-toluidine, triglycidyl isocyanurate, polyalkylene glycol diglycidyl ether, a glycidyl ether of a polyhydric alcohol such as glycerol, a hydantoin epoxy resin or an epoxidized product of an unsaturated polymer such as a petroleum resin.

When the silyl group-containing polymer of the present invention is combined with the epoxy resin, the ratio of use of the epoxy resin is preferably at most 100 parts by mass, more preferably from 1 to 50 parts by mass per 100 parts by mass of the silyl group-containing polymer. If the ratio of use of the epoxy resin exceeds 100 parts by mass, the hardness of a cured product of the curable composition tends to be high, and the cured product tends to have low flexibility.

The above epoxy resin curing agent is not particularly limited, and a commonly known epoxy resin curing agent may be used. The epoxy resin curing agent may, for example, be an amine such as triethylenetetramine, tetraethylenepentamine, diethylaminopropylamine, N-aminoethylpiperazine, m-xylylenediamine, m-phenylenediamine, diaminodiphenylmethane, diaminodiphenylsulfone, isophoronediamine or 2,4,6-tris(dimethylaminomethyl)phenol; a salt of the above amine, a blocked amine of the above amine by a ketimine compound or the like; a polyamide resin; an imidazole; a dicyandiamide; a boron trifluoride complex compound; a carboxylic anhydride such as phthalic anhydride, hexahydrophthalic anhydride, tetrahydrophthalic anhydride, dodecenylsuccinic anhydride or pyromellitic anhydride; a phenoxy resin, a carboxylic acid, an alcohol, a polyoxyalkylene oxide polymer having on an average of at least one group capable of reacting with an epoxy group in its molecule (e.g. terminal aminated polyoxypropylene glycol or terminal carboxylated polyoxypropylene glycol); or a liquid-form terminal functional group-containing polymer such as polybutadiene, hydrogenated polybutadiene, an acrylonitrile/butadiene copolymer or an acrylic polymer, having its terminal modified with a functional group selected from a hydroxyl group, a carboxyl group, an amino group and the like.

When the epoxy resin is combined with the epoxy resin curing agent, the ratio of use of the epoxy resin curing agent is preferably at most 300 parts by mass per 100 parts by mass of the epoxy resin.

(Solvent)

The silyl group-containing polymer of the present invention may be combined with a solvent to be formed into a curable composition. In such a case, the viscosity of the silyl group-containing polymer can be adjusted, and the storage stability of the silyl group-containing polymer can also be improved.

Such a solvent is not particularly limited, and it may, for example, be an aliphatic hydrocarbon, an aromatic hydrocarbon, a halogenated hydrocarbon, an alcohol, a ketone, an ester, an ether, an ester alcohol, a ketone alcohol, an ether alcohol, a ketone ether, a ketone ester or an ester ether.

Among them, it is preferred to use an alcohol as the solvent, whereby the storage stability of the curable composition can further be improved. Such an alcohol is preferably a $C_{1-10}$ alkyl alcohol, more preferably methanol, ethanol, isopropanol, isopentyl alcohol or hexyl alcohol, furthermore preferably methanol or ethanol.

When the silyl group-containing polymer of the present invention is combined with the solvent, the ratio of use of the solvent is preferably at most 500 parts by mass, more preferably from 1 to 100 parts by mass, per 100 parts by mass of the silyl group-containing polymer. If the ratio of use exceeds 500 parts by mass, shrinkage of a cured product of the curable composition by volatilization of the solvent i.e. so-called localized necking occurs in some cases, as compared with a case where the ratio of use is within the above range.

(Dehydrating Agent)

The silyl group-containing polymer of the present invention may be combined with a small amount of a dehydrating agent to be formed into a curable composition within a range of not adversely affecting curing properties and flexibility, in order to further improve storage stability.

Such a dehydrating agent may, for example, be an alkyl orthoformate such as methyl orthoformate or ethyl orthoformate; an alkyl orthoacetate such as methyl orthoacetate or ethyl orthoacetate; a hydrolysable organic silicon compound such as methyltrimethoxysilane, vinyltrimethoxysilane, tetramethoxysilane or tetraethoxysilane; or a hydrolysable organic titanium compound. Among them, vinyltrimethoxysilane or tetraethoxysilane is preferred in view of the cost and dehydrating performance.

When the silyl group-containing polymer of the present invention is combined with the dehydrating agent, the ratio of use of the dehydrating agent is preferably from 0.001 to 30 parts by mass, more preferably from 0.01 to 10 parts by mass per 100 parts by mass of the silyl group-containing polymer.

(Thixotropy-imparting Agent)

The silyl group-containing polymer of the present invention may be combined with a thixotropy-imparting agent as an anti-sagging agent to be formed into a curable composition.

The thixotropy-imparting agent is not particularly limited, and it may, for example, be hydrogenated castor oil or a fatty amide.

When the silyl group-containing polymer of the present invention is combined with the thixotropy-imparting agent, the ratio of use of the thixotropy-imparting agent is not particularly limited so long as desired anti-sagging properties are obtained.

(Anti-aging Agent)

The silyl group-containing polymer of the present invention may be combined with an anti-aging agent to be formed into a curable composition in order to further increase weather resistance and light resistance.

The anti-aging agent is not particularly limited, and at least one anti-aging agent selected from the group consisting of an antioxidant, an ultraviolet absorber, a photostabilizer and the like which are commonly added to a polyurethane resin or the like may be used. Specifically, a hindered amine, benzotriazole, benzophenone, benzoate, cyanoacrylate, acrylate, hindered phenol, phosphorus or sulfur type anti-aging agent may be mentioned. A preferred compound is properly selected from such compounds and combined with the silyl group-containing polymer of the present invention.

(Other Additives)

The silyl group-containing polymer of the present invention may be combined with, in addition to the above-described additives, additives such as an inorganic pigment such as iron oxide, chromium oxide or titanium oxide, an organic pigment such as phthalocyanine blue or phthalocyanine green, a mildewproofing agent or a blowing agent to be formed into a curable composition.

Further, it is also possible to blend a plural types of the above-described additives with the silyl group-containing polymer of the present invention to form a curable composition. Namely, the silyl group-containing polymer may be combined with at least one member selected from the group consisting of the curing catalyst, the filler, the plasticizer, the adhesion-imparting agent, the solvent, the dehydrating agent, the thixotropy-imparting agent, the anti-aging agent, the inorganic pigment, the organic pigment, the mildewproofing agent and the blowing agent, to be formed into a curable composition.

The preferred embodiments of the present invention have been described above, but the present invention is by no means restricted to the above embodiments.

EXAMPLES

Now, the present invention will be described in further detail with reference to Examples and Comparative Examples, but the present invention is by no means restricted to the following Examples. Hereinafter, propylene oxide will be referred to as PO, ethylene oxide EO, ε-caprolactone CL, γ-isocyanatepropyltrimethoxysilane TMS, and γ-isocyanatepropyltriethoxysilane TES.

Example 1

(First Step)

To a 10 L pressure reactor made of stainless steel equipped with a stirrer, 500 g of polyoxypropylene diol (Mn=1,000) as an initiator and zinc hexacyanocobaltate having tert-butyl alcohol as the ligand (hereinafter sometimes referred to as TBA-DMC catalyst) in an amount of 50 ppm based on the finish mass were charged.

The reactor was replaced with nitrogen, the temperature in the reactor was raised to 140° C., and 50 g of PO was charged in the reactor and reacted (DMC catalyst activating step by pre-supply of PO: step of activating the DMC catalyst by preliminarily supplying a small amount of PO). Then, after the pressure in the reactor decreased, 2,250 g of PO (the total addition amount of PO was 2,300 g) and 1,200 g of CL were charged at constant rates to the reactor to prepare a first mixed liquid. After PO and CL were charged over a certain period, the first mixed liquid was stirred for one hour for reaction while keeping the temperature of the first mixed liquid at 140° C. and the stirring rate at 500 rpm to obtain a polyester ether polyol (polyol A).

From results of measurement by $^{13}C$-NMR, the polyol A was confirmed to have a random copolymer chain of CL and PO.

(Second Step)

3,000 g of the polyol A was charged in a 5 L pressure reactor, heated to 110° C. and vacuum dehydrated. Then, the reactor was replaced with nitrogen, the temperature was decreased to 50° C., and 0.15 g of dibutyltin dilaurate was charged, followed by stirring for 30 minutes. Then, 158.7 g of TMS was charged in the reactor to prepare a second mixed liquid. The second mixed liquid was heated to 80° C. and stirred for 8 hours to react the polyol A with TMS. It was confirmed that a peak of the isocyanate disappeared by FT-IR and then, the second mixed liquid was cooled to room temperature to obtain a silyl group-containing polymer A.

Example 2

(First Step)

A polyester ether polyol (polyol B) was obtained in accordance with step 1 in Example 1 except that the amount of PO added afterward was 2,500 g (the total addition amount of PO was 2,550 g) and that the addition amount of CL was 1,950 g. From results of measurement by $^{13}$C-NMR, the polyol B was confirmed to have a random copolymer chain of CL and PO.

(Second Step)

A silyl group-containing polymer B was obtained in accordance with step 2 in Example 1 except that the polyol B was used instead of the polyol A and that the addition amount of TMS was 127.4 g.

Example 3

(First Step)

Using the same reactor as in Example 1, polyoxypropylene triol (Mn=1,000) as an initiator and a TBA-DMC catalyst in an amount of 50 ppm based on the finish mass of polyol C were charged. PO was reacted through the DMC catalyst activating step by pre-supply of PO, to obtain 5,000 g of polyoxypropylene triol having Mn of 10,000. A polyester ether polyol (polyol C) was obtained in accordance with step 1 in Example 1 except that 5,000 g of the above polyoxypropylene triol was used as an initiator instead of the initiator used in Example 1 and that 2,000 g of PO and 1,000 g of CL were added. From results of measurement by $^{13}$C-NMR, the polyol C was confirmed to have a random copolymer chain of CL and PO.

(Second Step)

A silyl group-containing polymer C was obtained in accordance with step 2 in Example 1 except that the polyol C was used instead of the polyol A and that the addition amount of TMS was 84.2 g.

Example 4

(First Step)

Using the same reactor as in Example 1, polyoxypropylene diol (Mn=1,000) as an initiator and a TBA-DMC catalyst in an amount of 50 ppm based on the finish mass of polyol D were charged. PO was reacted through the DMC catalyst activating step by pre-supply of PO, to obtain 4,000 g of polyoxypropylene dial having Mn of 10,000. A polyester ether polyol (polyol D) was obtained in accordance with step 1 in Example 1 except that 4,000 g of the above polyoxypropylene dial was used as an initiator instead of the initiator used in Example 1 and that 3,200 g of PO and 800 g of CL were added. From results of measurement by $^{13}$C-NMR, the polyol D was confirmed to have a random copolymer chain of CL and PO.

(Second Step)

A silyl group-containing polymer D was obtained in accordance with step 2 in Example 1 except that the polyol D was used instead of the polyol A and that the addition amount of TMS was 67.1 g.

Example 5

(First Step)

Using the same reactor as in Example 1, polyoxypropylene diol (Mn=1,000) as an initiator and a TBA-DMC catalyst in an amount of 50 ppm based on the finish mass of polyol E were charged. PO was reacted through the DMC catalyst activating step by pre-supply of PO, to obtain 3,500 g of polyoxypropylene dial having Mn of 7,000. A polyester ether polyol (polyol E) was obtained in accordance with step 1 in Example 1 except that 3,500 g of the above polyoxypropylene diol was used as an initiator instead of the initiator used in Example 1 and that 750 g of EO and 750 g of CL were added. From results of measurement by $^{13}$C-NMR, the polyol E was confirmed to have a random copolymer chain of CL and EO.

(Second Step)

A silyl group-containing polymer E was obtained in accordance with step 2 in Example 1 except that the polyol E was used instead of the polyol A and that the addition amount of TMS was 127.4 g.

Example 6

(First Step)

A polyester ether polyol (polyol F) was obtained in accordance with step 1 in Example 1 except that 1,950 g of PO (the total addition amount of PO was 2,000 g) was added instead of 2,250 g of PO added afterward, that 1,250 g of EO was added and that the addition amount of CL was 1,250 g. From results of measurement by $^{13}$C-NMR, the polyol F was confirmed to have a random copolymer chain of CL, EO and PO.

(Second Step)

A silyl group-containing polymer F was obtained in accordance with step 2 in Example 1 except that the polyol F was used instead of the polyol A and that the addition amount of TMS was 128.5 g.

Example 7

(First Step)

Using the same reactor as in Example 1, polyoxypropylene diol (Mn=1,000) as an initiator and a TBA-DMC catalyst in an amount of 50 ppm based on the finish mass of polyol G were charged. PO was reacted through the DMC catalyst activating step by pre-supply of PO, to obtain 2,500 g of polyoxypropylene diol having Mn of 5,000. A polyester ether polyol (polyol G) was obtained in accordance with step 1 in Example 1 except that 2,500 g of the above polyoxypropylene diol was used as an initiator instead of the initiator used in Example 1 and that 1,250 g of PO and 1,250 g of β-propiolactone were added. From results of measurement by $^{13}$C-NMR, the polyol G was confirmed to have a random copolymer chain of β-propiolactone and PO.

(Second Step)

A silyl group-containing polymer G was obtained in accordance with step 2 in Example 1 except that the polyol G was used instead of the polyol A and that the addition amount of TMS was 127.4 g.

Example 8

A silyl group-containing polymer H was obtained in accordance with steps 1 and 2 in Example 2 except that 153.4 g of TES was added instead of TMS in step 2 in Example 2.

Example 9

A silyl group-containing polymer I was obtained in accordance with steps 1 and 2 in Example 5 except that 154.7 g of TES was added instead of TMS in step 2 in Example 5.

Example 10

(First Step)

A polyester ether polyol (polyol J) was obtained in accordance with step 1 in Example 1 except that the amount of the TBA-DMC catalyst was 300 ppm based on the finish mass. From results of measurement by $^{13}$C-NMR, the polyol J was confirmed to have a random copolymer chain of CL and PO.

(Second Step)

A silyl group-containing polymer J was obtained in accordance with step 2 in Example 1 except that the polyol J was used instead of the polyol A and that no dibutyltin dilaurate was used.

Example 11

(First Step)

A polyester ether polyol (polyol K) was obtained in accordance with step 1 in Example 10 except that a DMC catalyst having glyme as the ligand (glyme-DMC catalyst) was used instead of the TBA-DMC catalyst. From results of measurement by $^{13}$C-NMR, the polyol K was confirmed to have a random copolymer chain of CL and PO.

(Second Step)

A silyl group-containing polymer K was obtained in accordance with step 2 in Example 10 except that the polyol K was used instead of the polyol J and that the addition amount of TMS was 128.6 g.

Comparative Example 1

(First Step)

A polyether polyol (polyol L) was obtained in accordance with step 1 in Example 1 except that the amount of PO added afterward was 4,450 g (the total addition amount of PO was 4,500 g) and that no CL was used. Properties of the obtained polyol L are shown in Table 1.

(Second Step)

A silyl group-containing polymer L was obtained in accordance with step 2 in Example 1 except that the polyol L was used instead of the polyol A and that the addition amount of TMS was 129.6 g.

Comparative Example 2

(First Step)

A polyether polyol (polyol M) was obtained in accordance with step 1 in Example 1 except that 2,450 g of PO (the total addition amount of PO was 2,500 g) was added instead of 2,250 g of PO added afterward, that 2,000 g of EO was added and that no CL was used.

(Second Step)

A silyl group-containing polymer M was obtained in accordance with step 2 in Example 1 except that the polyol M was used instead of the polyol A and that the addition amount of TMS was 129.1 g.

The amounts of use of materials used for preparation of the polyols A to M are shown in Table 1. Further, properties (number average molecular weight (Mn), Mw/Mn, viscosity at 25° C.) of the obtained polyols A to M are shown in Table 2. The viscosity is a value measured by using an E type viscometer VISCONIC model EHD (manufactured by TOKIMEC INC.) using a No. 1 rotor. Further, materials, physical property values, etc. of the obtained silyl group-containing polymers A to M are shown in Table 2. In Table 2, the "content of cyclic ester" is the content (mass %) of groups derived from the cyclic ester in the polyester ether polyol, and the "content of random copolymer chain" is the content (mass %) of the random copolymer chain of the alkylene oxide and the cyclic ester in the polyester ether polyol. These values are calculated from the amounts of materials charged.

(Preparation of Cured Product)

To 100 parts by mass of each of the silyl group-containing polymers A to M, 75 parts by mass of surface treated calcium carbonate (filler, HAKUENKA CCR manufactured by SHIRAISHI CALCIUM KAISHA, LTD.), 75 parts by mass of heavy calcium carbonate (filler, WHITON SB manufactured by SHIRAISHI CALCIUM KAISHA, LTD.), 40 parts by mass of bis-2-ethylhexyl phthalate (plasticizer), 3 parts by mass of hydrogenated castor oil (thixotropy-imparting agent, DISPARLON 6500 manufactured by Kusumoto Chemicals, Ltd.) and 1 part by mass of a hindered phenol antioxidant (IRGANOX 1010 manufactured by Ciba Specialty Chemicals) were added, followed by stirring by a planetary stirring machine (manufactured by KURABO INDUSTRIES LTD.) to obtain a mixture. The temperature of the mixture was decreased to room temperature, 3 parts by mass of vinyltrimethoxysilane (KBM-1003 manufactured by Shin-Etsu Chemical Co., Ltd.) was added, followed by stirring. Then, 1 part by mass of 3-glycidyloxypropyltrimethoxysilane (KBM-403 manufactured by Shin-Etsu Chemical Co., Ltd.) was added, followed by stirring, and 1 part by mass of dibutyltin dilaurate as a curing catalyst was added, followed by stirring to obtain respective curable compositions A to M. Then, each of the curable compositions A to M was formed into a sheet having a length of 100 mm, a width of 20 mm and a thickness of 0.2 mm on an aluminum plate, cured at 23° C. under a humidity of 50% for 7 days, and then the backer was removed, and the sheet was further cured at 50° C. under a humidity of 65% for 7 days to prepare cured products A to M. Each of the cured products A to M was taken out from a constant temperature and humidity bath and left to stand at 23° C. under a humidity of 50% for 24 hours or more to obtain cured products A to M as test specimens for physical properties.

(Evaluation Method)

(Test on Weather Resistance)

Each of the above cured products A to M was irradiated by Sunshine Weather Meter (manufactured by SUGA TEST INSTRUMENTS CO., LTD.) up to 780 hours, and the degree of surface deterioration was visually observed. As the surface deterioration, surface cracking on the cured products A to M was evaluated based on the following standards. The weather resistance was evaluated by visual observation of the surface of each of the cured products A to M 260 hours later, 560 hours later and 780 hours later, based on the evaluation standards ○: no cracks occurred, Δ: a few cracks occurred, and X: large cracks occurred. The obtained results are shown in Table 3.

(Surface Tack Test)

The surface tack of each of the cured products A to M was measured to evaluate the cured state of each of the above cured products A to M.

The surface tack was evaluated by touching the surface of each of the cured products A to M with a finger one day after curing of the cured products A to M. The tack was evaluated based on evaluation standards ○: no stickiness at all by touch with a finger, Δ: the surface being sticky, and X: the surface being considerably sticky. The obtained results are shown in Table 3.

(Dumbbell Physical Properties)

As the dumbbell physical properties, the coefficient of elongation, the 50% modulus and the maximum tensile strength were measured using a No. 3 dumbbell in accordance with JIS K6301 at a pulling rate of 200 mm/min. The obtained results are shown in Table 3.

TABLE 1

| | Polyol | | | | | | | | | | | | |
|---|---|---|---|---|---|---|---|---|---|---|---|---|---|
| | A | B | C | D | E | F | G | H | I | J | K | L | M |
| Initiator (g) | 500 | 500 | 5000 | 4000 | 3500 | 500 | 2500 | 500 | 3500 | 500 | 500 | 500 | 500 |
| Total amount of PO (g) | 2300 | 2550 | 2000 | 3200 | 0 | 2000 | 1250 | 2550 | 0 | 2300 | 2300 | 4500 | 2500 |
| Pre-supplied PO (g) | 50 | 50 | 0 | 0 | 0 | 50 | 0 | 50 | 0 | 50 | 50 | 50 | 50 |
| EO (g) | 0 | 0 | 0 | 0 | 750 | 1250 | 0 | 0 | 750 | 0 | 0 | 0 | 2000 |
| CL (g) | 1200 | 1950 | 1000 | 800 | 750 | 1250 | 0 | 1950 | 750 | 1200 | 1200 | 0 | 0 |
| (%) | 30.0 | 39.0 | 12.5 | 10.0 | 15.0 | 25.0 | 0 | 39.0 | 15.0 | 30.0 | 30.0 | 0 | 0 |
| PL (g) | 0 | 0 | 0 | 0 | 0 | 0 | 1250 | 0 | 0 | 0 | 0 | 0 | 0 |
| (%) | 0 | 0 | 0 | 0 | 0 | 0 | 25.0 | 0 | 0 | 0 | 0 | 0 | 0 |
| Total amount of materials (g) | 4000 | 5000 | 8000 | 8000 | 5000 | 5000 | 5000 | 5000 | 5000 | 4000 | 4000 | 5000 | 5000 |
| Total amount of monomers corresponding to random chain (g) | 3500 | 4500 | 3000 | 4000 | 1500 | 4450 | 2500 | 4500 | 1500 | 3500 | 3500 | 0 | 0 |
| (%) | 87.5 | 90.0 | 37.5 | 50.0 | 30.0 | 89.0 | 50.0 | 90.0 | 30.0 | 87.5 | 87.5 | 0 | 0 |

CL: caprolactone
PL: propiolactone
PO: propylene oxide
EO: ethylene oxide

TABLE 2

| | | Silyl group-containing polymer | | | | | | |
|---|---|---|---|---|---|---|---|---|
| | | A | B | C | D | E | F | G |
| Physical properties | Structure | CL/PO random | CL/PO random | CL/PO random | CL/PO random | CL/EO random | CL/PO/EO random | PL/PO random |
| | Molecular weight | 8000 | 10000 | 16000 | 20000 | 10000 | 10000 | 10000 |
| | Mw/Mn | 1.10 | 1.17 | 1.20 | 1.22 | 1.20 | 1.15 | 1.15 |
| | Viscosity (mPa·s) | At least 50000 | At least 50000 | At least 100000 | At least 100000 | At least 50000 | At least 50000 | At least 50000 |
| | Number of hydroxyl groups | 2 | 2 | 3 | 2 | 2 | 2 | 2 |
| Alkylene oxide | | PO | PO | PO | PO | EO | EO/PO | PO |
| Cyclic ester | | CL | CL | CL | CL | CL | CL | PL |
| Polymerization catalyst | | TBA-DMC | TBA-DMC | TBA-DMC | TBA-DMC | TBA-DMC | TBA-DMC | TBA-DMC |
| Silyl isocyanate compound | | TMS | TMS | TMS | TMS | TMS | TMS | TMS |
| Urethane-forming catalyst | | DBTDL | DBTDL | DBTDL | DBTDL | DBTDL | DBTDL | DBTDL |
| Content of cyclic ester | | 30.0 | 39.0 | 12.5 | 10.0 | 15.0 | 25.0 | 25.0 |
| Content of random copolymer chain | | 87.5 | 90.0 | 37.5 | 50.0 | 30.0 | 89.0 | 50.0 |

| | | Silyl group-containing polymer | | | | | |
|---|---|---|---|---|---|---|---|
| | | H | I | J | K | L | M |
| Physical properties | Structure | CL/PO random | CL/EO random | CL/PO random | CL/PO random | PO straight | PO/EO random |

TABLE 2-continued

|  |  |  |  |  |  |  |  |
|---|---|---|---|---|---|---|---|
|  | Molecular weight | 10000 | 10000 | 8000 | 8000 | 10000 | 10000 |
|  | Mw/Mn | 1.17 | 1.20 | 1.05 | 1.10 | 1.08 | 1.10 |
|  | Viscosity (mPa·s) | At least 50000 | At least 50000 | At least 50000 | At least 50000 | 4900 | 8000 |
|  | Number of hydroxyl groups | 2 | 2 | 2 | 2 | 2 | 2 |
| Alkylene oxide |  | PO | EO | PO | PO | PO | EO/PO |
| Cyclic ester |  | CL | CL | CL | CL | — | — |
| Polymerization catalyst |  | TBA-DMC | TBA-DMC | TBA-DMC | Glyme-DMC | TBA-DMC | TBA-DMC |
| Silyl isocyanate compound |  | TES | TES | TMS | TMS | TMS | TMS |
| Urethane-forming catalyst |  | DBTDL | DBTDL | — | — | DBTDL | DBTDL |
| Content of cyclic ester |  | 39.0 | 15.0 | 30.0 | 30.0 | 0 | 0 |
| Content of random copolymer chain |  | 90.0 | 30.0 | 87.5 | 87.5 | — | — |

CL: caprolactone
PL: propiolactone
PO: propylene oxide
EO: ethylene oxide
TBA-DMC: zinc hexacyanocobaltate/tert-butyl alcohol complex
Glyme-DMC: zinc hexacyanocobaltate/glyme complex
TMS: γ-isocyanatepropyltrimethoxysilane
TES: γ-isocyanatepropyltriethoxysilane
DBTDL: dibutyltin dilaurate

TABLE 3

|  |  | Ex. 1 | Ex. 2 | Ex. 3 | Ex. 4 | Ex. 5 | Ex. 6 | Ex. 7 |
|---|---|---|---|---|---|---|---|---|
| Silyl group-containing polymer A |  | 100 |  |  |  |  |  |  |
| Silyl group-containing polymer B |  |  | 100 |  |  |  |  |  |
| Silyl group-containing polymer C |  |  |  | 100 |  |  |  |  |
| Silyl group-containing polymer D |  |  |  |  | 100 |  |  |  |
| Silyl group-containing polymer E |  |  |  |  |  | 100 |  |  |
| Silyl group-containing polymer F |  |  |  |  |  |  | 100 |  |
| Silyl group-containing polymer G |  |  |  |  |  |  |  | 100 |
| Silyl group-containing polymer H |  |  |  |  |  |  |  |  |
| Silyl group-containing polymer I |  |  |  |  |  |  |  |  |
| Silyl group-containing polymer J |  |  |  |  |  |  |  |  |
| Silyl group-containing polymer K |  |  |  |  |  |  |  |  |
| Silyl group-containing polymer L |  |  |  |  |  |  |  |  |
| Silyl group-containing polymer M |  |  |  |  |  |  |  |  |
| HAKUENKA CCR |  | 75 | 75 | 75 | 75 | 75 | 75 | 75 |
| WHITON SB |  | 75 | 75 | 75 | 75 | 75 | 75 | 75 |
| Bis-2-ethylhexyl phthalate |  | 40 | 40 | 40 | 40 | 40 | 40 | 40 |
| DISPARLON 6500 |  | 3 | 3 | 3 | 3 | 3 | 3 | 3 |
| IRGANOX 1010 |  | 1 | 1 | 1 | 1 | 1 | 1 | 1 |
| KBM1003 |  | 3 | 3 | 3 | 3 | 3 | 3 | 3 |
| KBM403 |  | 1 | 1 | 1 | 1 | 1 | 1 | 1 |
| Dibutyltin dilaurate |  | 1 | 1 | 1 | 1 | 1 | 1 | 1 |
| Dumbbell physical properties | Elongation (%) | 163 | 181 | 175 | 636 | 185 | 178 | 185 |
|  | 50% modulus (N/mm$^2$) | 0.56 | 0.47 | 0.50 | 0.22 | 0.46 | 0.47 | 0.46 |
|  | Maximum tensile strength (N/mm$^2$) | 1.02 | 0.88 | 0.93 | 0.73 | 0.82 | 0.86 | 0.83 |
| Weather resistance test | 260 Hours later | ○ | ○ | ○ | ○ | ○ | ○ | ○ |
|  | 520 Hours later | ○ | ○ | ○ | ○ | ○ | ○ | ○ |
|  | 780 Hours later | ○ | ○ | ○ | ○ | ○ | ○ | ○ |
| Surface stickiness | Tack after one day | ○ | ○ | ○ | ○ | ○ | ○ | ○ |

|  |  | Ex. 8 | Ex. 9 | Ex. 10 | Ex. 11 | Comp. Ex. 1 | Comp. Ex. 2 |
|---|---|---|---|---|---|---|---|
| Silyl group-containing polymer A |  |  |  |  |  |  |  |
| Silyl group-containing polymer B |  |  |  |  |  |  |  |
| Silyl group-containing polymer C |  |  |  |  |  |  |  |
| Silyl group-containing polymer D |  |  |  |  |  |  |  |
| Silyl group-containing polymer E |  |  |  |  |  |  |  |
| Silyl group-containing polymer F |  |  |  |  |  |  |  |
| Silyl group-containing polymer G |  |  |  |  |  |  |  |
| Silyl group-containing polymer H |  | 100 |  |  |  |  |  |
| Silyl group-containing polymer I |  |  | 100 |  |  |  |  |

| | | | | | | |
|---|---|---|---|---|---|---|
| Silyl group-containing polymer J | | | 100 | | | |
| Silyl group-containing polymer K | | | | 100 | | |
| Silyl group-containing polymer L | | | | | 100 | |
| Silyl group-containing polymer M | | | | | | 100 |
| HAKUENKA CCR | 75 | 75 | 75 | 75 | 75 | 75 |
| WHITON SB | 75 | 75 | 75 | 75 | 75 | 75 |
| Bis-2-ethylhexyl phthalate | 40 | 40 | 40 | 40 | 40 | 40 |
| DISPARLON 6500 | 3 | 3 | 3 | 3 | 3 | 3 |
| IRGANOX 1010 | 1 | 1 | 1 | 1 | 1 | 1 |
| KBM1003 | 3 | 3 | 3 | 3 | 3 | 3 |
| KBM403 | 1 | 1 | 1 | 1 | 1 | 1 |
| Dibutyltin dilaurate | 1 | 1 | 1 | 1 | 1 | 1 |
| Dumbbell physical properties | Elongation (%) | 200 | 206 | 171 | 170 | 170 | 172 |
| | 50% modulus (N/mm$^2$) | 0.45 | 0.43 | 0.52 | 0.53 | 0.49 | 0.47 |
| | Maximum tensile strength (N/mm$^2$) | 0.87 | 0.82 | 0.96 | 0.96 | 0.96 | 0.93 |
| Weather resistance test | 260 Hours later | ◯ | ◯ | ◯ | ◯ | ◯ | ◯ |
| | 520 Hours later | ◯ | ◯ | ◯ | ◯ | Δ | Δ |
| | 780 Hours later | ◯ | ◯ | ◯ | ◯ | X | X |
| Surface stickiness | Tack after one day | ◯ | ◯ | ◯ | ◯ | Δ | Δ |

As shown in Table 3, in Examples 1 to 11, no cracks occurred even 780 hours later, and the result of the surface tack test one day after curing was favorable, as compared with Comparative Examples 1 and 2. Therefore, it was confirmed that according to the silyl group-containing polymer of the present invention, quick and strong curing is possible, and a cured product excellent in antifouling properties and weather resistance while maintaining favorable rubber elasticity can be obtained.

INDUSTRIAL APPLICABILITY

The silyl group-containing polymer of the present invention can be cured quickly and strongly to provide a cured product excellent in antifouling properties and weather resistance while maintaining favorable rubber elasticity, and it is thereby suitably used in the fields of a covering composition and a sealing composition such as a sealant, a waterproofing agent, an adhesive and a coating agent for buildings.

The entire disclosure of Japanese Patent Application No. 2005-292854 filed on Oct. 5, 2005 including specification, claims and summary is incorporated herein by reference in its entirety.

What is claimed is:

1. A silyl group-containing polymer represented by the following formula (1):

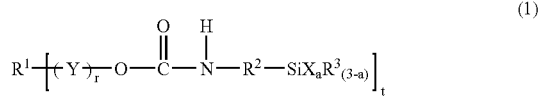
(1)

wherein R$^1$ is a group having a hydroxyl group(s) removed from a monohydroxy or polyhydroxy compound having t hydroxyl group(s) in its molecule, R$^2$ is a bivalent organic group, R$^3$ is a C$_{1-20}$ monovalent organic group which may have a substituent, X is a hydroxyl group or a hydrolysable group, Y is a bivalent group derived from a combination of at least one cyclic ester and at least one alkylene oxide, wherein the group derived from the cyclic ester is represented by the following formula (A) and the group derived from the alkylene oxide is represented by the following formula (B), "a" is an integer of from 1 to 3, r is an integer of from 2 to 1,000, and t is an integer of from 1 to 8, provided that when a plurality of Y's are present in the molecule, the plurality of Y's may be the same or different, and when t is from 2 to 8, a plurality of monovalent groups bonded to R$^1$ may be the same or different:

(A)

(B)

in the formula (A), R$^4$ is a C$_{2-8}$ alkylene group, and in the formula (B), R$^5$ is a C$_{2-4}$ alkylene group.

2. A silyl group-containing polymer represented by the following formula (2):

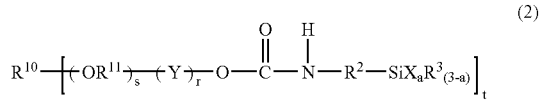
(2)

wherein R$^2$ is a bivalent organic group, R$^3$ is a C$_{1-20}$ monovalent organic group which may have a substituent, R$^{10}$ is a C$_{1-20}$ t-valent hydrocarbon group, R$^{11}$ is a C$_{2-4}$ alkylene group, X is a hydroxyl group or a hydrolysable group, Y is a bivalent group derived from a combination of at least one cyclic ester and at least one alkylene oxide, wherein the group derived from the cyclic ester is represented by the following formula (A) and the group derived from the alkylene oxide is represented by the following formula (B), "a" is an integer of from 1 to 3, r is an integer of from 2 to 1,000, t is an integer of from 1 to 8, and s is an integer of from 1 to 250, provided that when a plurality of Y's are present in the molecule, the plurality of Y's may be the same or different, and when t is 2 to 8, a plurality of monovalent groups bonded to R$^{10}$ may be the same or different:

(A)

(B)

in the formula (A), $R^4$ is a $C_{2-8}$ alkylene group, and in the formula (B), $R^5$ is a $C_{2-4}$ alkylene group.

3. The silyl group-containing polymer according to claim 1, wherein $R^2$ is a $C_{1-17}$ bivalent hydrocarbon group.

4. The silyl group-containing polymer according to claim 2, wherein $R^2$ is a $C_{1-17}$ bivalent hydrocarbon group.

5. The silyl group-containing polymer according to claim 1, wherein the Si atom is bonded to the α-position of $R^2$.

6. The silyl group-containing polymer according to claim 2, wherein the Si atom is bonded to the α-position of $R^2$.

7. A process for producing the silyl group-containing polymer as defined in claim 1, which comprises first reacting a monohydroxy or polyhydroxy compound having from 1 to 8 hydroxyl group(s) in its molecule, a $C_{3-9}$ cyclic ester and a $C_{2-4}$ alkylene oxide in the presence of a polymerization catalyst to obtain a polyester ether polyol, and second, reacting the polyester polyol and a silyl isocyanate compound in the presence of a urethane-forming catalyst to obtain the silyl group-containing polymer.

8. A process for producing the silyl group-containing polymer as defined in claim 2, which comprises first reacting a monohydroxy or polyhydroxy compound having from 1 to 8 hydroxyl group(s) in its molecule, a $C_{3-9}$ cyclic ester and a $C_{2-4}$ alkylene oxide in the presence of a polymerization catalyst to obtain a polyester ether polyol, and second, reacting the polyester polyol and a silyl isocyanate compound in the presence of a urethane-forming catalyst to obtain the silyl group-containing polymer.

9. The process according to claim 7, wherein the polymerization catalyst is a double metal cyanide complex catalyst, and the polymerization catalyst and the urethane-forming catalyst are the same.

10. The process according to claim 8, wherein the polymerization catalyst is a double metal cyanide complex catalyst, and the polymerization catalyst and the urethane-forming catalyst are the same.

11. The process according to claim 7, wherein the content of a bivalent group represented by the following formula (A) derived from the cyclic ester in the polyester ether polyol is from 5 to 50 mass %:

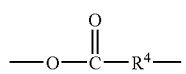
(A)

wherein $R^4$ is a $C_{2-8}$ alkylene group.

12. The process according to claim 8, wherein the content of a bivalent group represented by the following formula (A) derived from the cyclic ester in the polyester ether polyol is from 5 to 50 mass %:

wherein $R^4$ is a $C_{2-8}$ alkylene group.

13. The process according to claim 7, wherein the polyester ether polyol has a number average molecular weight (Mn) of from 2,000 to 30,000, and a molecular weight distribution (Mw/Mn) of at most 2.0.

14. The process according to claim 8, wherein the polyester ether polyol has a number average molecular weight (Mn) of from 2,000 to 30,000, and a molecular weight distribution (Mw/Mn) of at most 2.0.

15. The process according to claim 7, wherein the $C_{2-4}$ alkylene oxide is propylene oxide, and the $C_{3-9}$ cyclic ester is ε-caprolactone.

16. The process according to claim 8, wherein the $C_{2-4}$ alkylene oxide is propylene oxide, and the $C_{3-9}$ cyclic ester is ε-caprolactone.

17. The process according to claim 7, wherein the silyl isocyanate compound is γ-isocyanatepropyltrimethoxysilane, γ-isocyanatepropyltriethoxysilane or α-isocyanatemethylmethyldimethoxysilane.

18. The process according to claim 8, wherein the silyl isocyanate compound is γ-isocyanatepropyltrimethoxysilane, γ-isocyanatepropyltriethoxysilane or α-isocyanatemethylmethyldimethoxysilane.

19. The process according to claim 9, wherein the double metal cyanide complex catalyst is a zinc hexacyanocobaltate complex catalyst.

20. The process according to claim 10, wherein the double metal cyanide complex catalyst is a zinc hexacyanocobaltate complex catalyst.

21. The silyl group-containing polymer according to claim 1, wherein t is at least 2.

22. The silyl group-containing polymer according to claim 2, wherein t is at least 2.

\* \* \* \* \*